(12) United States Patent
Huang et al.

(10) Patent No.: US 11,679,488 B2
(45) Date of Patent: Jun. 20, 2023

(54) ADAPTER AND POWER TOOL SYSTEM

(71) Applicant: Globe (Jiangsu) Co., Ltd, Jiangsu (CN)

(72) Inventors: Lei Huang, Jiangsu (CN); Xinzhong Guo, Jiangsu (CN); An Yan, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 268 days.

(21) Appl. No.: 17/120,134

(22) Filed: Dec. 12, 2020

(65) Prior Publication Data

US 2021/0178569 A1 Jun. 17, 2021

(30) Foreign Application Priority Data

Dec. 12, 2019 (CN) .......................... 201911271606.8

(51) Int. Cl.
*H01M 10/46* (2006.01)
*B25F 5/02* (2006.01)
*H01M 50/204* (2021.01)
*H02J 7/00* (2006.01)

(52) U.S. Cl.
CPC .............. *B25F 5/02* (2013.01); *H01M 50/204* (2021.01); *H02J 7/0044* (2013.01)

(58) Field of Classification Search
CPC ...... H02J 7/0044; H02J 7/0042; H02J 7/0045; H01M 50/502; H01M 50/204; B25F 5/02; Y02E 60/10
USPC ................... 320/107, 114, 115; 429/96, 100; 307/150; D13/103
See application file for complete search history.

(56) References Cited

U.S. PATENT DOCUMENTS

2011/0147031 A1 6/2011 Matthias et al.
2017/0125754 A1 5/2017 Ota et al.

FOREIGN PATENT DOCUMENTS

| CN | 106654131 A | 5/2017 |
|---|---|---|
| CN | 109891621 A | 6/2019 |
| EP | 1903657 A2 | 3/2008 |

OTHER PUBLICATIONS

Translation of Chinese document CN106654131A. May 10, 2017. (Year: 2017).*
Extended Search Report of Counterpart European Patent Application No. 20213422.7 dated May 6, 2021.

* cited by examiner

*Primary Examiner* — Edward Tso

(57) ABSTRACT

An adapter for connecting a multi-voltage battery pack to a power tool, the multi-voltage battery pack provided with a multi-voltage battery interface and configured to output at least two different voltages, the power tool provided with a power tool interface and detachable coupled with a single voltage battery pack, the multi-voltage battery interface being not coupleable to the power tool interface, the adapter has a housing, an input port disposed in the housing and provided for electrically and mechanically coupling with the multi-voltage battery interface of the multi-voltage voltage battery pack, an output port disposed in the housing and provided for electrically and mechanically coupling with the power tool interface of the power tool, the input port electrically connected with the output port, wherein the power tool can be powered by the multi-voltage battery pack via the adapter.

13 Claims, 12 Drawing Sheets

ADAPTER AND POWER TOOL SYSTEM

CROSS-REFERENCE TO RELATED INVENTIONS

This application is a US application which claims the priority of CN invention Serial No. CN201911271606.8, filed on Dec. 12, 2019, the disclosures of which are hereby incorporated by reference in their entirety.

TECHNICAL FIELD

The invention relates to an adapter and a power tool system with the adapter.

BACKGROUND ART

Generally, different power tools, such as hand-held blowers, hand-held electric drills, and the like, have different rated working voltages, therefore, manufacturers need to configure each power tool with a corresponding battery pack. When there are a various power tools, user must equip with a plurality of battery packs in various specifications. Therefore, maintenance difficulty is increased for user, and a large space is occupied for storing the battery packs. Secondly, different power tools have different usage rates. For example, handheld blowers are typically used more frequently in autumn and less frequently in other seasons. Moreover, different users have different use frequency for different power tools. For example, some users use the suction blowers frequently, and use the electric drill occasionally. Therefore, the battery pack matched with the electric drill is in an idle state for a long time, and resource waste is caused.

In order to solve the problems, technician design a battery pack with a multi-voltage battery interface, wherein the multi-voltage battery interface has multiple coupling states so as to output different voltages through different coupling states, thereby achieving the purpose that the battery pack is matched with multiple power tools, further improving the utilization rate of the battery pack and reducing the maintenance difficulty for users. However, a voltage input interface provided on a power tool is matched with an output interface provided on a single voltage battery pack, whose output interface only can output single voltage. Therefore, the battery pack only with the multi-voltage battery interface cannot matched with the voltage input interface arranged on the power tool using single voltage battery pack, so that the existing power tool cannot use the multi-voltage battery pack.

In view of the above, there is a need for an adapter to solve the above problems.

SUMMARY OF INVENTION

The object of the present invention is to provide an adapter, which can connect a multi-voltage battery interface of a multi-voltage battery pack with a power tool input interface of a power tool coupling with a single voltage battery pack, so that the power tool matchable with the single voltage can be powered by the multi-voltage battery pack, and an application range of the multi-voltage battery pack with a multi-voltage battery interface is expanded.

In order to achieve the above object, the present invention provides an adapter for connecting a multi-voltage battery pack to a power tool, the multi-voltage battery pack provided with a multi-voltage battery interface and configured to output at least two different voltages, the power tool provided with a power tool interface and detachably coupled with a single voltage battery pack, the single voltage battery pack configured to output only one voltage, the multi-voltage battery interface of the multi-voltage battery pack being not couplable to the power tool interface of the power tool, the adapter comprises a housing, an input port disposed in the housing and provided for electrically and mechanically coupling with the multi-voltage battery interface of the multi-voltage battery pack, an output port disposed in the housing an provided for electrically and mechanically coupling with the power tool interface of the power tool, the output port electrically connected with the input port, wherein the power tool can be powered by the multi-voltage battery pack when the multi-voltage battery interface of the multi-voltage battery pack is coupled with the input port of the adapter and the power tool interface of the power tool is coupled with the output port of the adapter.

As a further improvement of the present invention, the input port is provided with a switching mechanism matched with the multi-voltage battery interface of the multi-voltage battery pack so as to change the output voltage of the multi-voltage battery pack.

As a further improvement of the present invention, the multi-voltage battery pack comprises a first string of battery cells and a second string of battery cells, and the multi-voltage battery interface comprises a first positive terminal connected with a positive electrode of the first string of battery cells, a first negative terminal connected with a negative electrode of the first string battery cells, a second positive terminal connected with a positive electrode of the second string of battery cells and a second negative terminal connected with a negative electrode of the second string of battery cell; the input port comprises a first input terminal, a second input terminal, a third input terminal and a fourth input terminal which are respectively detachably matched with the first positive terminal, the first negative terminal, the second positive terminal and the second negative terminal; the second input terminal and the third input terminal are electrically connected, the multi-voltage battery pack outputs a series voltage when the multi-voltage battery interface of the multi-voltage battery pack engages with the input port of the adapter.

As a further improvement of the present invention, the housing forms an inserting slot on a side thereof away from the output port, and the multi-voltage battery interface of the multi-voltage battery pack slides into the inserting slot.

As a further improvement of the present invention, the output port is provided with a full-proof mechanism, and the power tool interface of the power tool is provided with an auxiliary mechanism matchable with the full-proof mechanism.

As a further improvement of the present invention, the full-proof mechanism is a protrusion, and the auxiliary mechanism is a groove matched with the protrusion.

As a further improvement of the present invention, the adapter further comprises a latching mechanism mounted on the housing; the housing is provided with a receiving cavity; the latching mechanism is provided with a latching arm and a pressing arm, the latching arm is partially received in the receiving cavity and partially protrudes out of the receiving cavity, the pressing arm partially protrudes out of the receiving cavity and is linked with the latching arm; when the pressing arm is pressed, the latching arm enters into the receiving cavity.

As a further improvement of the present invention, the latching mechanism also comprises an elastic element matched with the pressing arm or the latching arm; the elastic element is elastically deformed when the pressing arm is released; and the pressing arm or the latching arm resets under an action of the elastic element when the pressing arm is pressed.

In order to achieve the above object, the present invention also provides a power tool system, the power tool system comprises a power tool provided with a power tool interface for coupling with a single voltage battery pack, the single voltage battery pack can output only one voltage, a multi-voltage battery pack provide with a multi-voltage battery interface and configured to output at least two different voltages, the multi-voltage battery interface being not couplable with the power tool interface, an adapter, the adapter comprises a housing, an input port disposed in the housing and provided for electrically and mechanically coupling with the multi-voltage battery interface of the multi-voltage battery pack, an output port disposed in the housing an provided for electrically and mechanically coupling with the power tool interface of the power tool, the output port electrically connected with the input port, wherein the power tool can be powered by the multi-voltage battery pack when the multi-voltage battery interface of the multi-voltage battery pack is coupled with the input port of the adapter and the power tool interface of the power tool is coupled with the output port of the adapter.

As a further improvement of the present invention, the input port of the adapter is provided with a switching mechanism matched with the multi-voltage battery interface to change the output voltage of the multi-voltage battery pack.

As a further improvement of the present invention, the multi-voltage battery pack comprises a first string of battery cells and a second string of battery cells, and the multi-voltage battery interface comprises a first positive terminal connected with a positive electrode of the first string of battery cells, a first negative terminal connected with a negative electrode of the first string battery cells, a second positive terminal connected with a positive electrode of the second string of battery cells and a second negative terminal connected with a negative electrode of the second string of battery cell; the input port comprises a first input terminal, a second input terminal, a third input terminal and a fourth input terminal which are respectively detachably matched with the first positive terminal, the first negative terminal, the second positive terminal and the second negative terminal; the second input terminal and the third input terminal are electrically connected, the multi-voltage battery pack outputs a series voltage when the multi-voltage battery interface of the multi-voltage battery pack engages with the input port of the adapter.

As a further improvement of the present invention, the output port of the adapter is provided with a full-proof mechanism, and the power tool interface of the power tool is provided with an auxiliary mechanism matchable with the full-proof mechanism.

As a further improvement of the present invention, the adapter has a latching mechanism mounted on the housing; the housing is provided with a receiving cavity; the latching mechanism is provided with a latching arm and a pressing arm, the latching arm is partially received in the receiving cavity and partially protrudes out of the receiving cavity, the pressing arm partially protrudes out of the receiving cavity and is linked with the latching arm; when the pressing arm is pressed, the latching arm enters into the receiving cavity.

As a further improvement of the present invention, the latching mechanism also comprises an elastic element matched with the pressing arm or the latching arm; the elastic element is elastically deformed when the pressing arm is pressed; and the pressing arm or the latching arm resets under an action of the elastic element when the pressing arm is released.

In order to achieve the above object, the present invention also provides a power tool system, the power tool system comprises a multi-voltage battery pack provided with a multi-voltage battery interface and configured to output at least two different voltages, a single voltage battery pack configured to output only one voltage, a power tool provided with a power tool interface for electrically and mechanically coupling with the single voltage battery pack, the multi-voltage battery interface being not couplable with the power tool interface, an adapter, the adapter comprises a housing, an input port disposed in the housing and provided for electrically and mechanically coupling with the multi-voltage battery interface of the multi-voltage battery pack, an output port disposed in the housing an provided for electrically and mechanically coupling with the power tool interface of the power tool, the output port electrically connected with the input port, wherein the power tool can be powered by the multi-voltage battery pack when the multi-voltage battery interface of the multi-voltage battery pack is coupled with the input port of the adapter and the power tool interface of the power tool is coupled with the output port of the adapter.

The beneficial effect of the present invention is that: the adapter of the present invention can connect the multi-voltage battery interface of the multi-voltage battery pack with the power tool interface of a power tool matching with the single voltage battery pack, so that the power tool coupling with the single voltage battery pack can be powered by a multi-voltage battery pack via the adapter, and an application range of a multi-voltage battery pack with an multi-voltage battery interface is expanded.

DESCRIPTION OF EMBODIMENT

In order to make the objectives, technical solutions, and advantages of the present invention clearer, the following describes the present invention in detail with reference to accompanying drawings and specific embodiment.

Different power tools, such as hand-held blowers, hand-held electric drills, hand-held sanders, and the like, typically have different rated operating voltages, manufacturers are required to configure each power tool with a corresponding battery pack. Such battery packs have only one output voltage, so that such battery packs can only be coupled with a single type of power tools but not a plurality of power tools required different rated operating voltages. So, technicians have designed a battery pack with a multi-voltage battery interface to match a plurality of power tools with different rated voltages. However, a voltage input interface of existing power tool in user's hand is designed to be matched with an output interface of a single voltage battery pack, which can only output one voltage. Therefore, the battery pack with multi-voltage battery interface cannot matched with the voltage input interface of the existing power tool of the user, so that the application range of the battery pack with the multi-voltage battery interface is limited.

Figure 1:
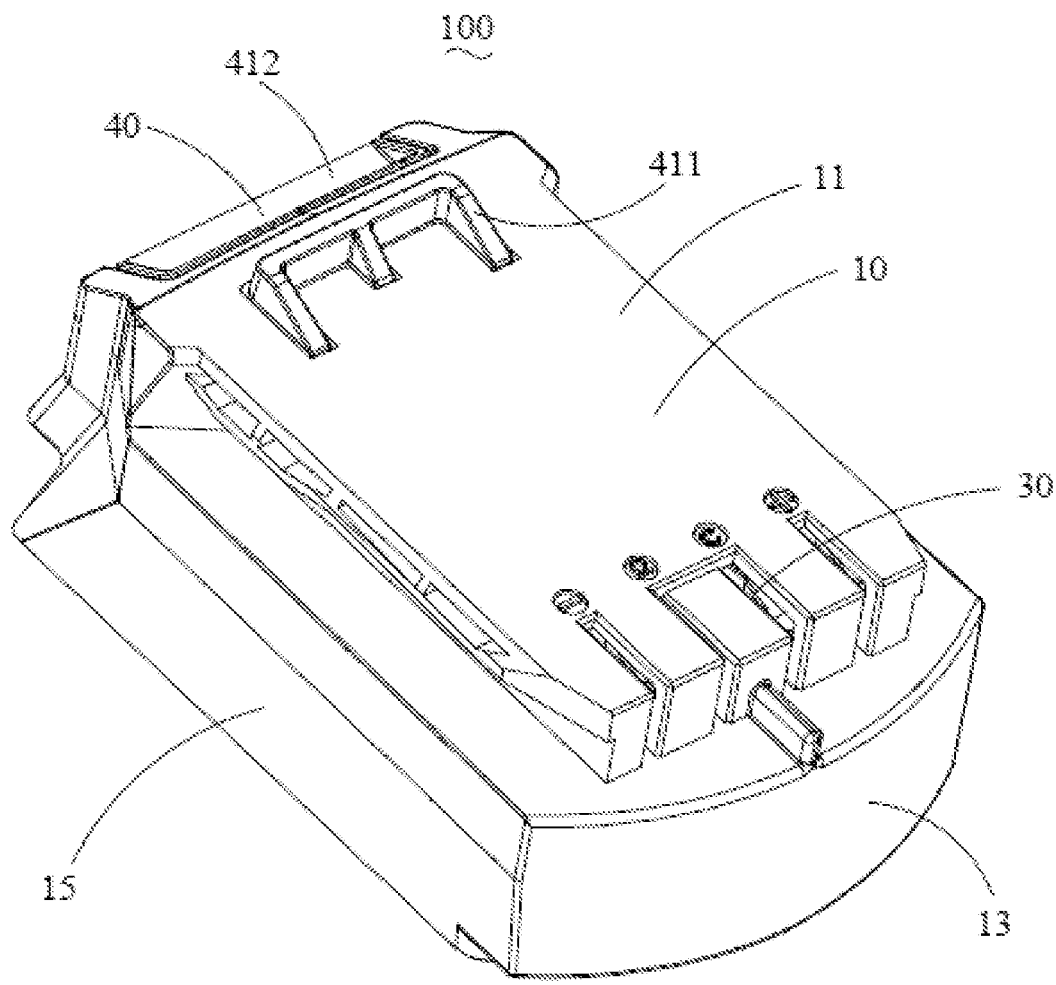
FIG. 1 is a perspective view of an adapter according to an embodiment of the present invention.
Figure 2:
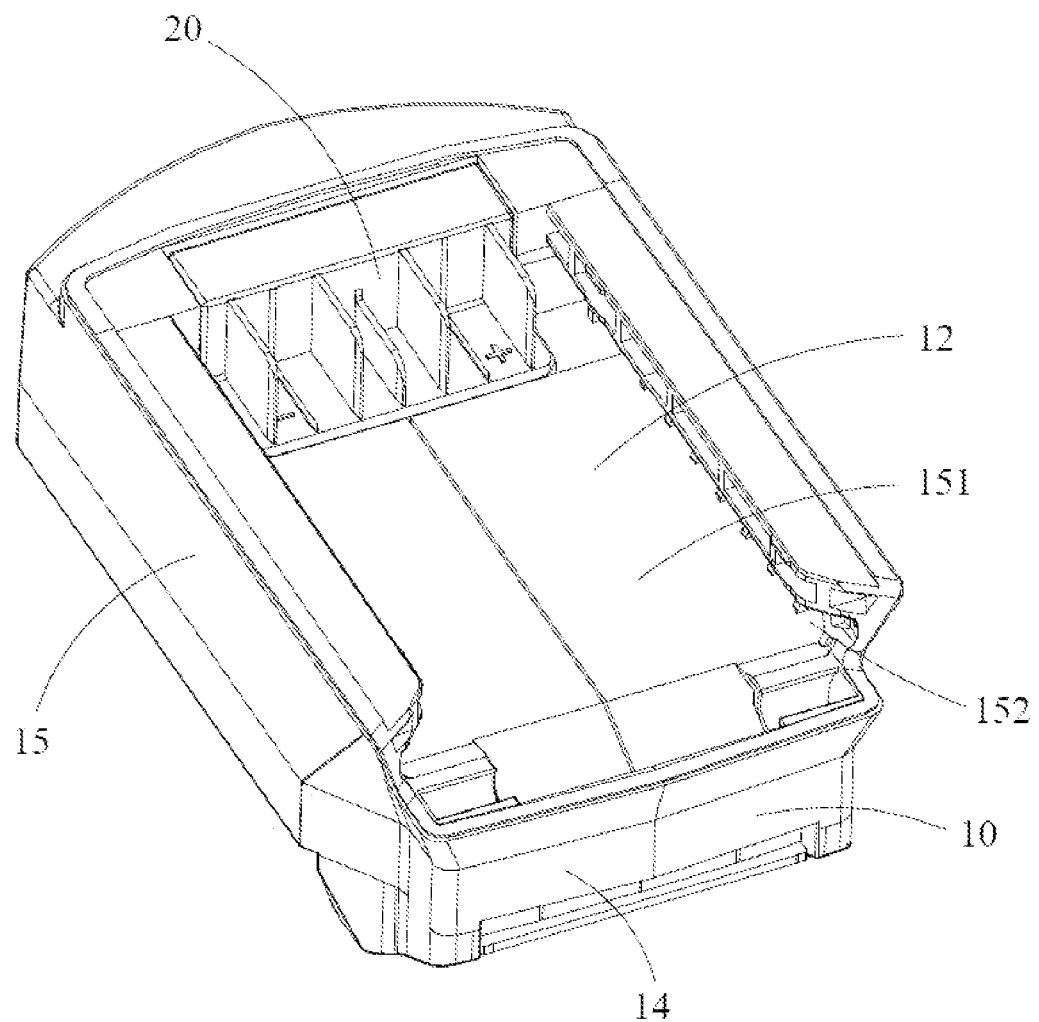
FIG. 2 is another perspective view showing the bottom of the adapter shown in FIG. 1.

Referring to FIG. 1 and FIG. 2, the present invention discloses an adapter 100 for solving the problem that the power tool coupling with single voltage battery pack cannot be matched with the multi-voltage battery pack, so as to expand the application range of the multi-voltage battery pack. The adapter 100 has a housing 10, an input port 20, an output port 30 mating with the input port 20 and a latching mechanism 40.

Figure 3:
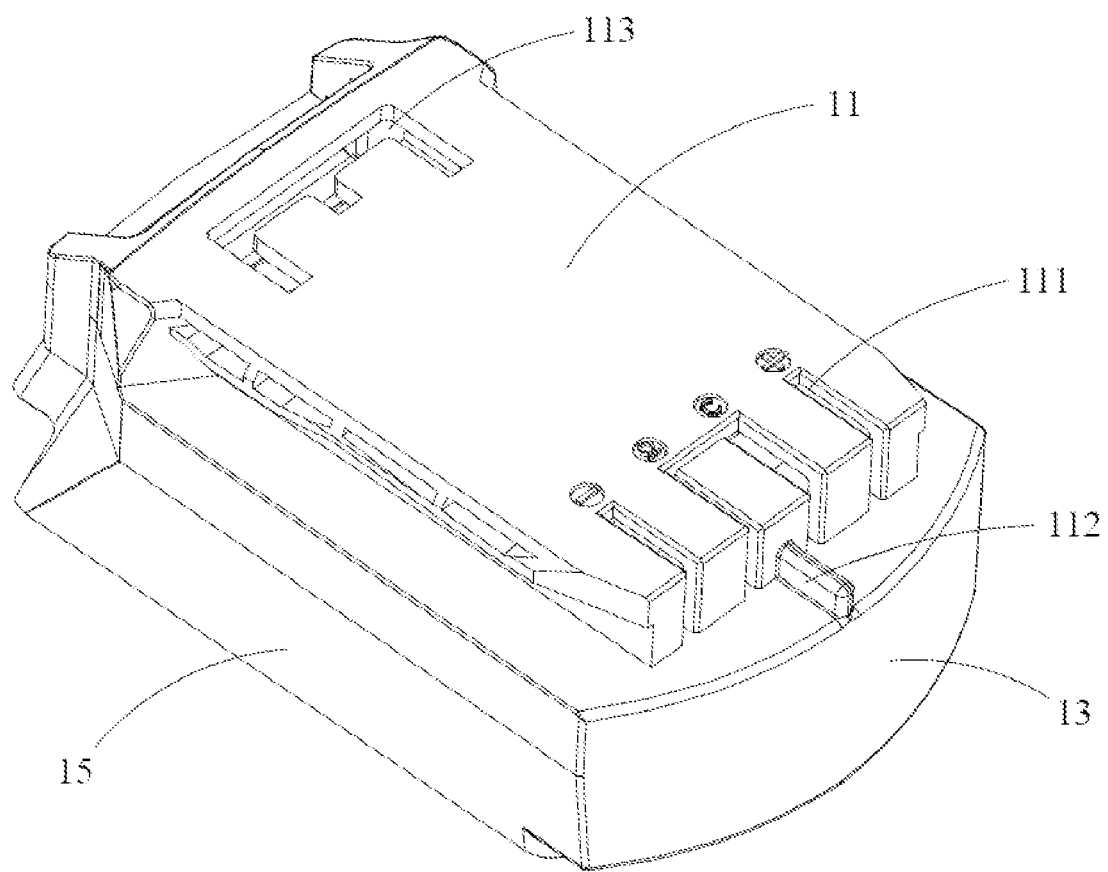
FIG. 3 is a perspective view of a housing of the adapter.
Figure 4:
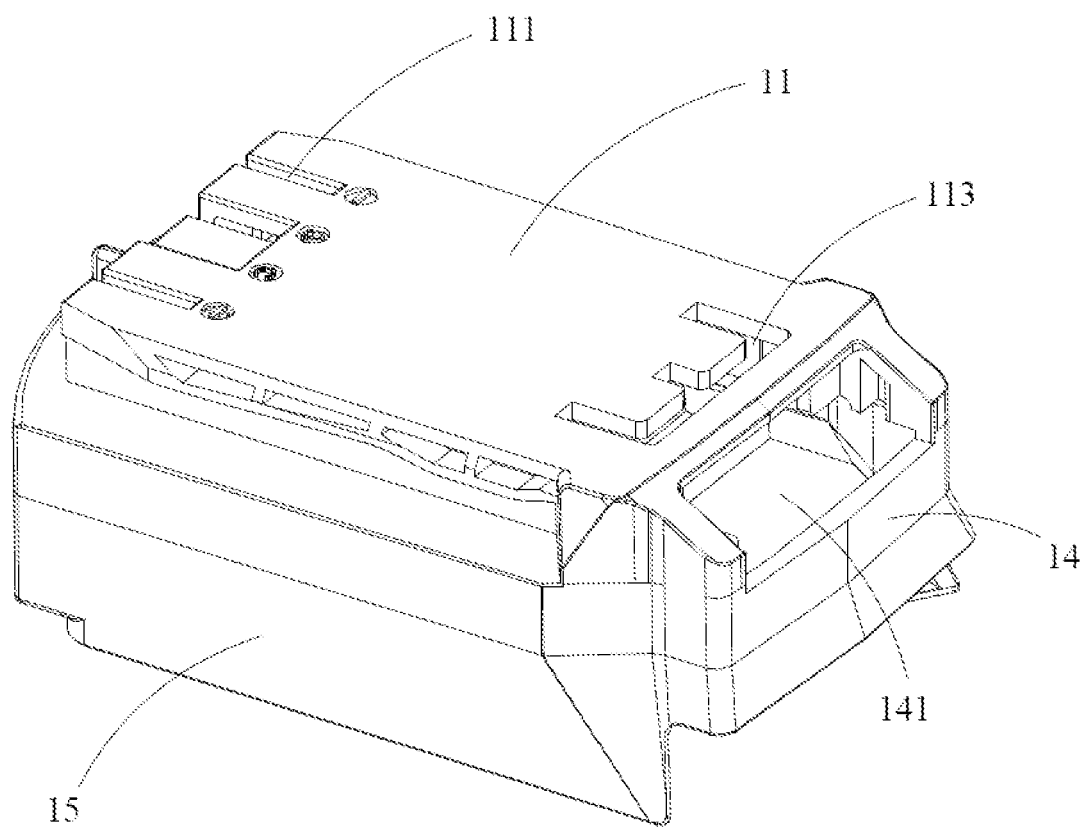
FIG. 4 is another perspective view of the housing shown in FIG. 3.
Figure 5:
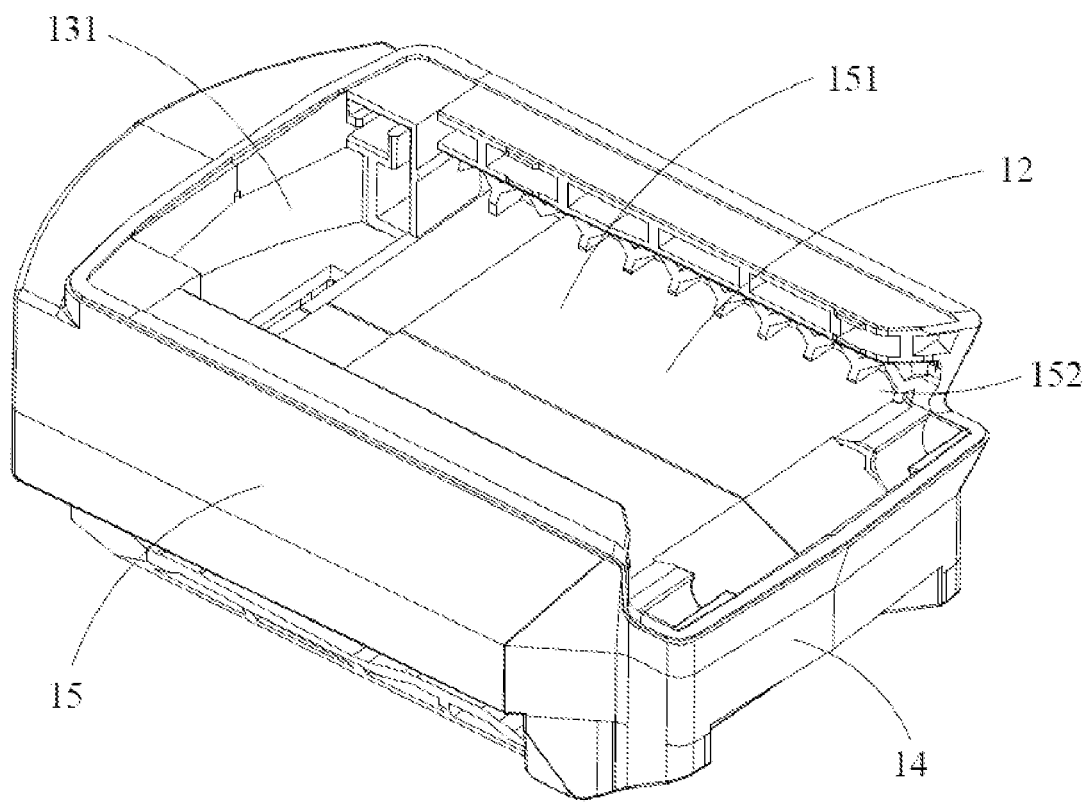
FIG. 5 is a further perspective view showing the bottom of the housing shown in FIG. 3.

Referring to FIG. 3, FIG. 4 and FIG. 5, the housing 10 has a top wall 11, a bottom wall 12 opposite to the top wall 11, a front wall 13 near the output port 30, a rear wall 14 near the latching mechanism 40, and two side walls 15 at two sides of the top wall 12. The top wall 11, the bottom wall 12, the front wall 13, the rear wall 14, and the side walls 15 jointly define a receiving cavity (not shown) for receiving the input port 20, the output port 30 and the latching mechanism 40. An output terminal groove 111 and a full-proof mechanism 112 are provided at an end of the top wall 11 close to the front wall 13. The output terminal groove 111 is communicated with the receiving cavity, and the full-proof mechanism 112 is located between the output terminal groove 111 and the front wall 13.

The full-proof mechanism 112 is used to cooperate with an auxiliary mechanism (not shown) disposed on the power tool to avoid plugging by mistake. In this embodiment, the full-proof mechanism 112 is disposed on the housing 10, but it is understood that the full-proof mechanism 112 may also be disposed on the output port 30. In this embodiment, the full-proof mechanism 112 is a protrusion, and the auxiliary mechanism on the power tool is a groove matched with the protrusion. However, it is understood that there are various specific structures of the full-proof mechanism 112, and the present invention is not described in detail herein.

The top wall 11 is provided with a retaining groove 113 communicated with the receiving cavity on an end thereof close to the rear wall 14. An input terminal groove 131 communicated with the receiving cavity is arranged between the front wall 13 and the bottom wall 12. The rear wall 14 is provided with a pressing groove 141 communicating with the receiving cavity. The bottom wall 12 and the side wall 15 together form an inserting slot 151 for a multi-voltage battery interface of the battery pack sliding into. The side wall 15 is further provided with a sliding rail 152 to guide the battery pack to slide into on a side thereof facing the inserting slot 151. In this embodiment, the sliding rail 152 is a groove. However, it is understood that the sliding rail 152 may also be a protrusion, and the present invention is not limited to the specific structure of the sliding rail 152.

The input port 20 is coupled to the multi-voltage battery interface provided on the multi-voltage battery pack to obtain an output power of the battery pack. The multi-voltage battery interface has at least two coupling states; when the multi-voltage battery interface is in a first coupling state, the multi-voltage battery interface outputs a first voltage; when the multi-voltage battery interface is in a second coupling state, the multi-voltage battery interface outputs a second voltage different from the first voltage. The input port 20 is provided with a switching mechanism which is matched with the multi-voltage battery interface to change the output voltage of the multi-voltage battery interface.

Figure 6:
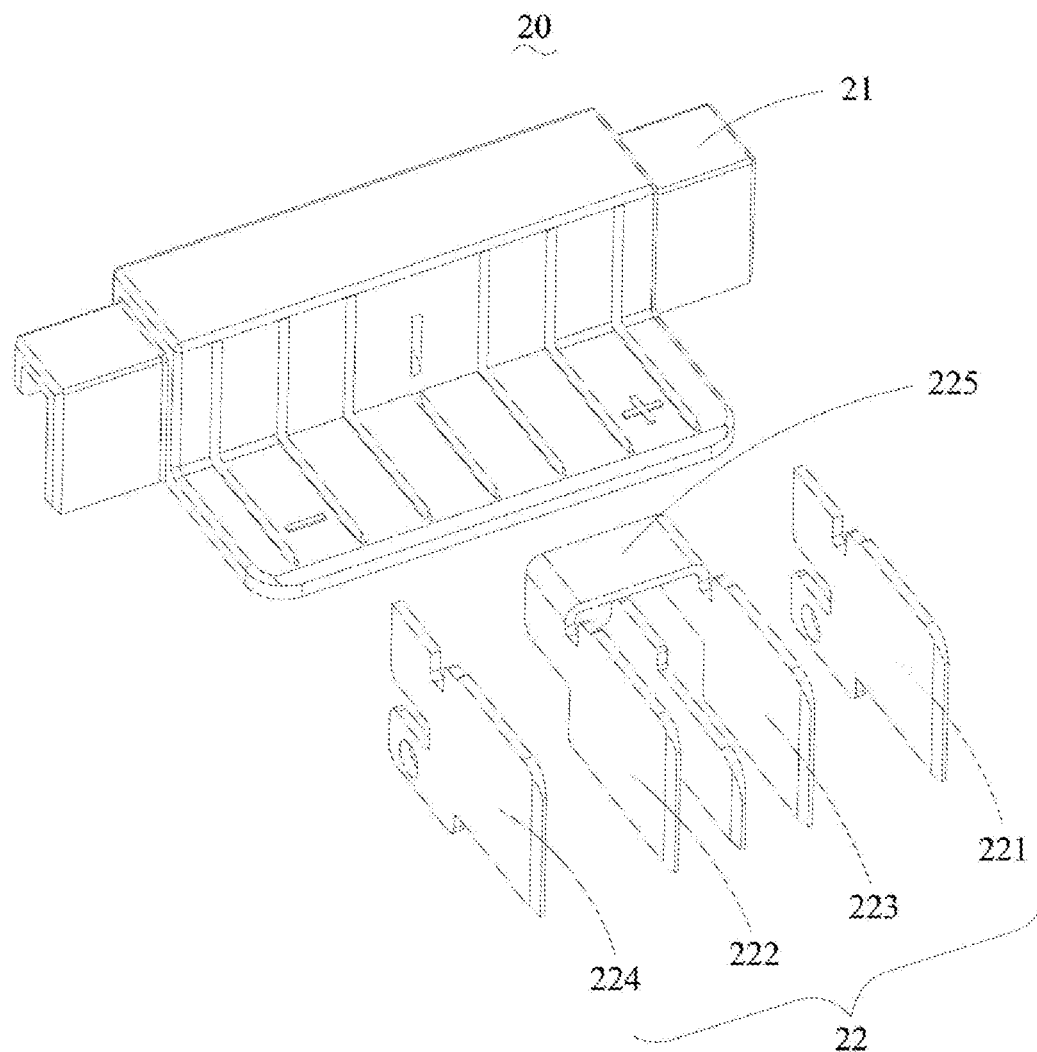
FIG. 6 is an exploded view of an input port of the adapter.
Figure 10:
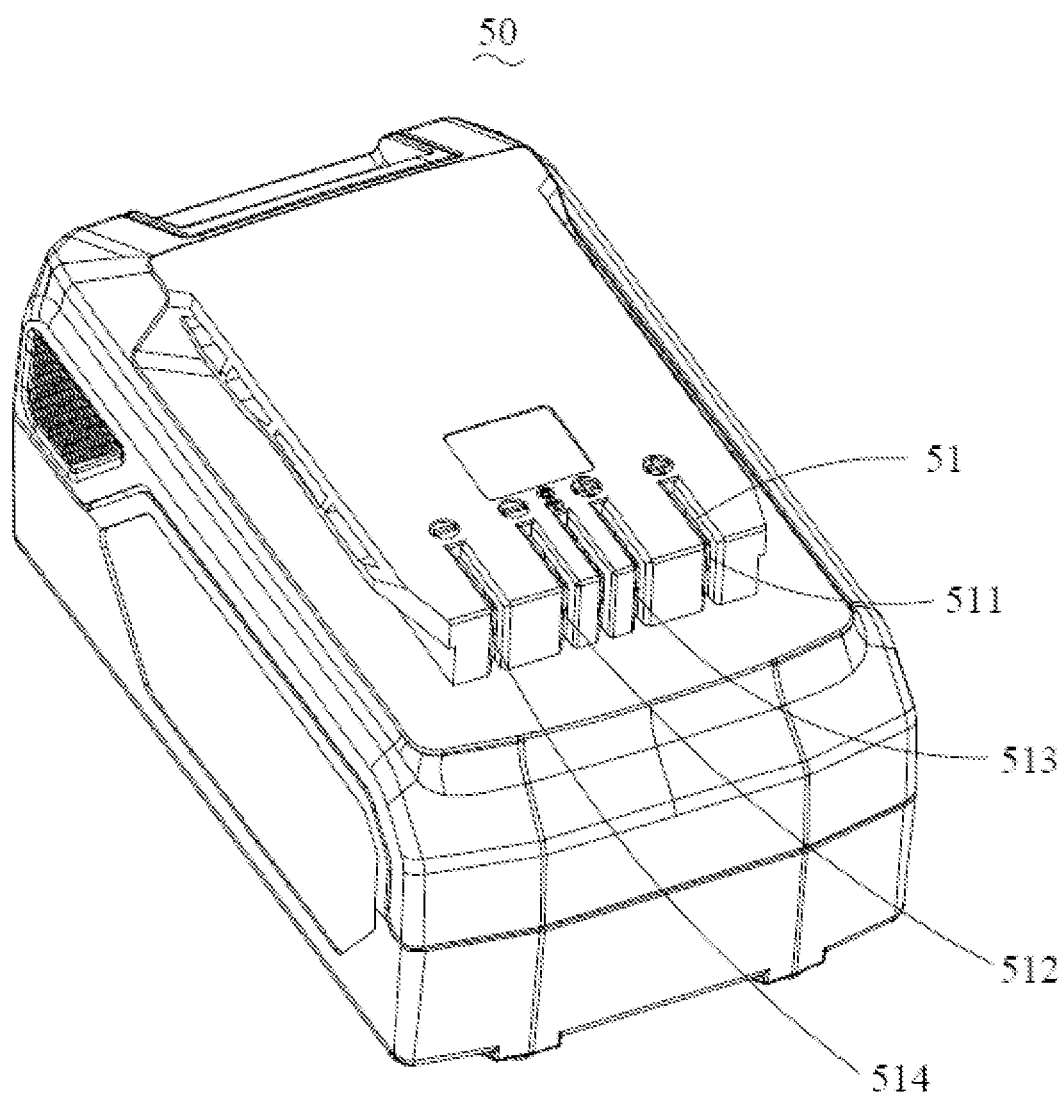
FIG. 10 is a perspective view of a multi-voltage battery pack.

FIG. 6 illustrates one of many embodiments of the present invention, wherein the input port 20 is configured to mate with a multi-voltage battery pack 50 shown in FIG. 10. The multi-voltage battery pack 50 is provided with a multi-voltage battery interface 51, and at least includes a first string of battery cells (not shown) and a second string of battery cells (not shown, in each battery string, a plurality of battery cells are series connected). The multi-voltage battery interface 51 has a first positive terminal 511 connected to a positive electrode of the first string of battery cells, a first negative terminal 512 connected to a negative electrode of the first string of battery cells, a second positive terminal 513 connected to a positive electrode of the second string of battery cells, and a second negative terminal 514 connected to a negative electrode of the second string of battery cell. When the first positive terminal 511 and the second negative terminal 514 are electrically connected or the second positive terminal 513 and the first negative terminal 512 are electrically connected, the first string of battery cells and the second string of battery cells are series connected, the multi-voltage battery pack outputs a first voltage (series voltage), when the first positive terminal 511 and the second positive terminal 513 are electrically connected, the first negative terminal 512 and the second negative terminal 514 are electrically connected, the first string of battery cells and the second string of battery cells are paralleled connected, the multi-voltage battery pack outputs a second voltage (parallel voltage).

Referring to FIG. 6, the input port 20 includes a base 21 and a terminal group 22 installed in the base 21. The terminal group 22 protrudes out of the input terminal groove 131, and includes a first input terminal 221, a second input terminal 222, a third input terminal 223, and a fourth input terminal 224. The first input terminal 221 matches with the first positive output terminal 511, the second input terminal 222 matches with the negative output terminal 512, the third input terminal 223 matches with the second positive output electrode 513, and the fourth input terminal 224 matches with the second negative output terminal 514. A conductive sheet 225 is disposed to connect the second input terminal 222 and the third input terminal 223, so that the second input terminal 222 and the third input terminal 223 are electrically connected. In this embodiment, the terminal group 22 is the switching mechanism. By such arrangement, the voltage supplied to the input port 20 by the multi-voltage battery interface 51 of the multi-voltage battery pack is a series voltage. In the present embodiment, the second input terminal 222 and the third input terminal 223 are electrically connected, but it is understood that in other embodiments, the first input terminal 221 and the fourth input terminal 224 may be electrically connected as long as the multi-voltage battery pack 50 can output the series voltage. When the first input terminal 221 and the third input terminal 223 are electrically connected and the second input terminal 222 and the fourth input terminal 224 are electrically connected, the first string of battery cells and the second string of battery cells are paralleled connected. The multi-voltage battery pack 50 outputs a parallel voltage, which is lower than the series voltage.

It can be understood that the structure of the multi-voltage battery interface 51 has various structures, for example, Chinese patent application No. 201780067581.2 discloses various interfaces capable of realizing multi-voltage output, and this is not repeated in the present invention. The present invention is intended to connect the multi-voltage battery interface of the multi-voltage battery pack with the power tool interface of the power tool matching with a single voltage battery pack, and therefore, the input port 20 only need to match with the multi-voltage battery interface 51 of the multi-voltage battery pack. The present invention does not particularly limit the specific structure of the input port 20.

Figure 7:
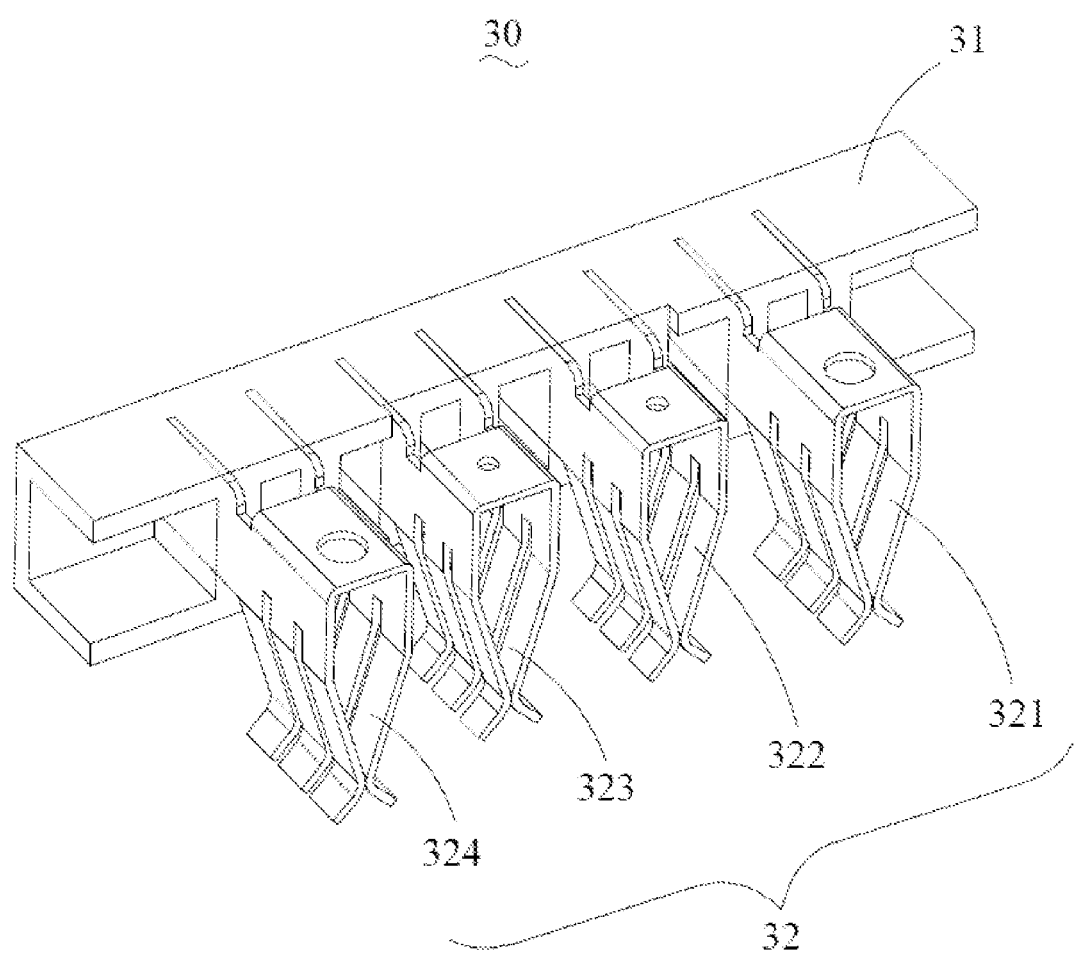
FIG. 7 is a perspective view of an output port of the adapter.

Referring to FIG. 7, the output port 30 is electrically connected to the input port 20 to obtain the power. The output port 30 is coupled to a power tool interface of the power tool 60 to output the power. The output port 30 can output the first voltage or the second voltage according to the different configuration of the input port 20. In this embodiment, the first voltage is the series voltage, and the second voltage is the parallel voltage. It is understood that the voltages output from the multi-voltage battery pack is not limited to two types but may be various. For example, the battery pack disclosed in Chinese patent application No. 201780067581.2 can output more than three types of voltages.

Figure 8:
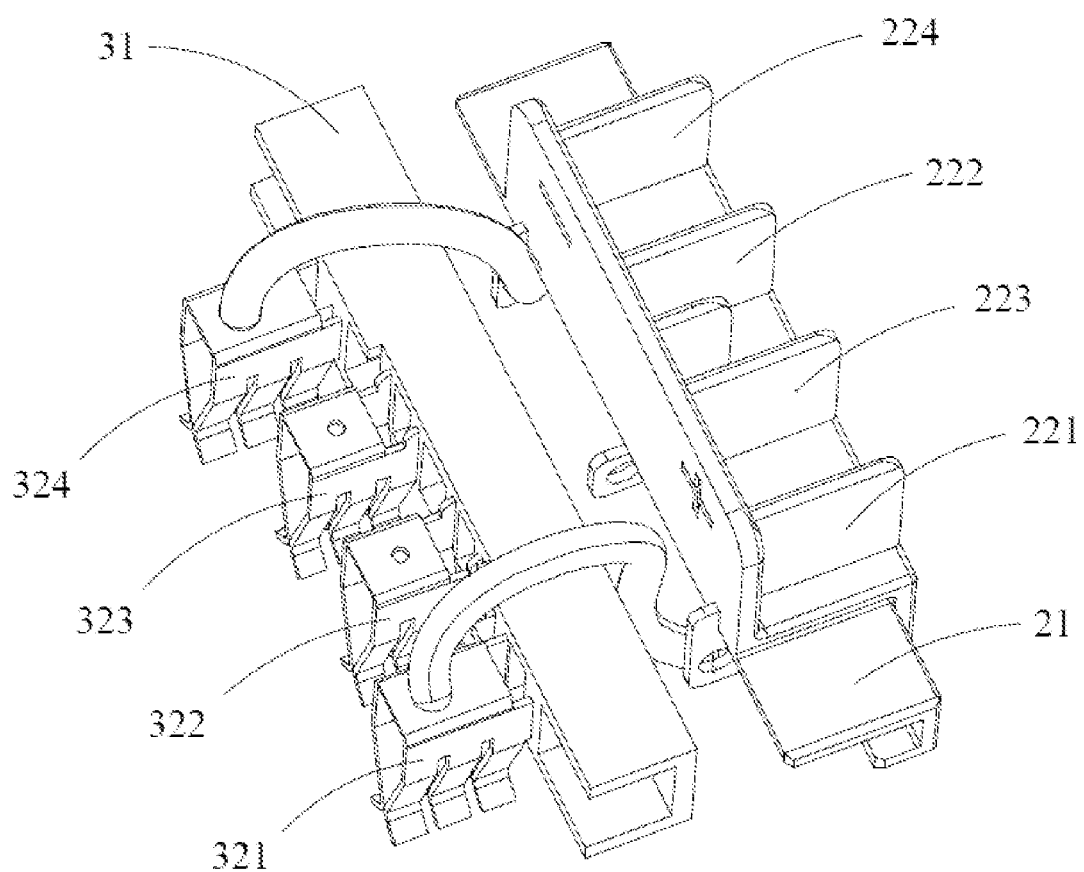
FIG. 8 is a view showing the connection between the input port and the output port.
Figure 11:
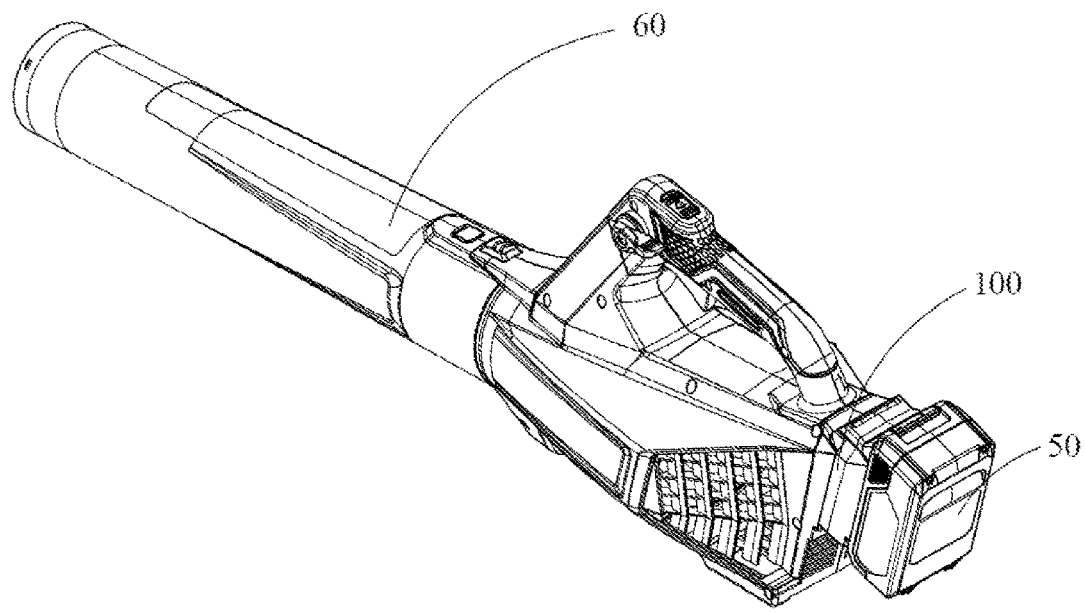
FIG. 11 is a view showing the power tool, the adapter, and the multi-voltage battery pack are matched with each other.

FIG. 7 illustrates one embodiment of the present invention, showing the output port 30 for mating with the power tool 60 shown in FIG. 11. The power tool 60 is provided with a power tool interface (not shown) for matching with a single voltage battery pack that only can output one voltage, and the power tool interface of the power tool 60 cannot couple with the multi-voltage battery interface 51 of the multi-voltage battery pack. The output port 30 includes a base portion 31 and a terminal set 32 mounted in the base portion 31. The terminal set 32 protrudes out of the output terminal groove 111, and includes a first output terminal 321, a communication terminal 322, a supporting terminal 323 (the supporting terminal 323 can be omitted), and a second output terminal 324. FIG. 8 is a schematic view illustrating the connection between the output port 30 and the input port 20. The first output terminal 321 is electrically connected to the first input terminal 221, and the second output terminal 324 is electrically connected to the fourth input terminal 224 to transmit the power. The communication terminal 322 is electrically connected to the input communication terminal (not shown) of the input port 20 to transmit the signal.

Figure 9:
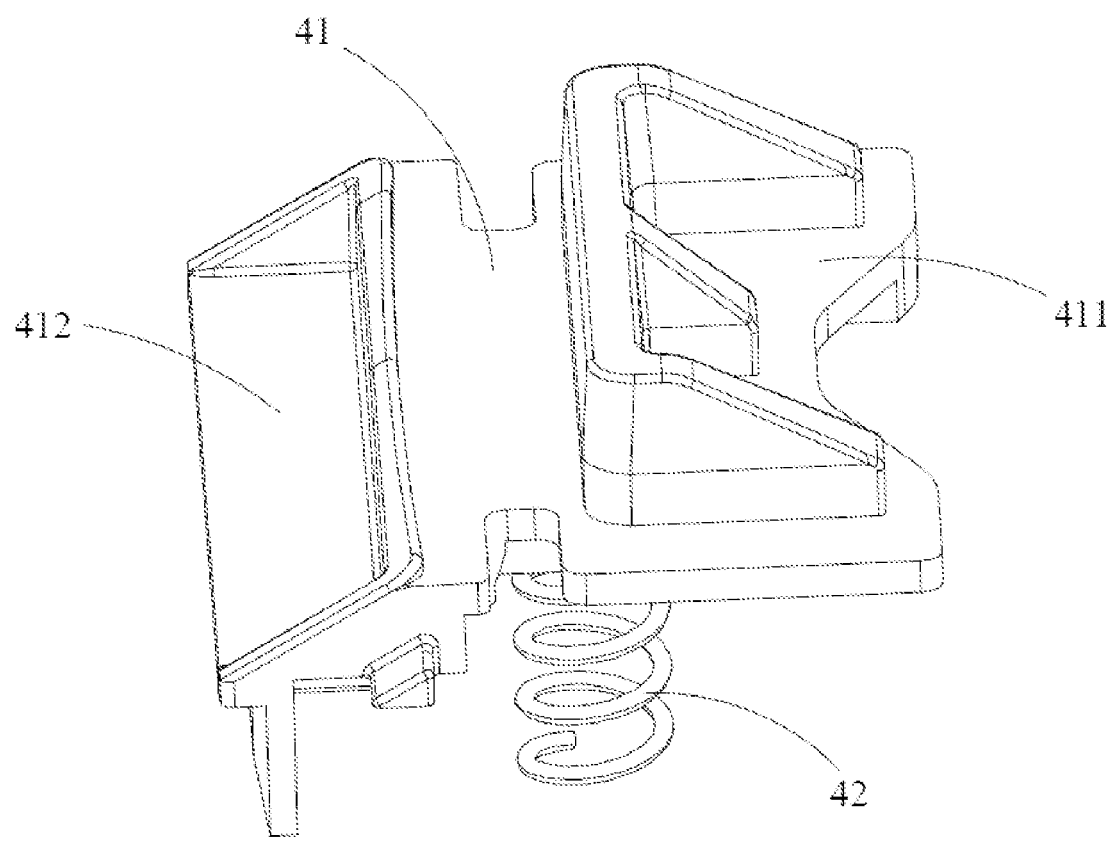
FIG. 9 is a perspective view of a latching mechanism of the adapter.

Referring to FIG. 9, the latching mechanism 40 includes a main body 41 and an elastic element 42 engaged with the main body 41. The main body 41 has a latching arm 411 at one end thereof and a pressing arm 412 at the other end thereof. The latching arm 411 is partially received in the receiving cavity and partially protrudes out of the receiving cavity from the retaining groove 113. The pressing arm 412 partially protrudes out of the receiving cavity through the pressing groove 141 and is linked with the latching arm 411. One end of the elastic element 42 is fixedly mounted on the main body 41, and the other end of the elastic element 42 is mounted on the housing 10. When the pressing arm 412 is pressed, the latching arm 411 is driven by the pressing arm 412 to move and enter the receiving cavity from the retaining groove 113, and at this time, the elastic element 42 is in an elastic deformation state. When the pressing arm 412 is released, the pressing arm 412 or the latching arm 411 resets under an action of the elastic element 42. In the present embodiment, the elastic element 42 is a spring, but in other embodiments, the elastic element 42 may also be an elastic plastic, an elastic sheet, or the like.

Referring to FIG. 1, FIG. 2, FIG. 9 and FIG. 11, when the adapter 100 of the present invention is used, firstly, the pressing arm 412 is pressed, the latching arm 411 enters the receiving cavity, and the power tool interface of the power tool 60 mates with the output port 30 of the adapter 100; then the pressing arm 412 is released, and the latching arm 411 resets under the action of the elastic element 42 and cooperates with a retaining structure disposed on the power tool 60 to fix the adapter 100 on the power tool 60. After that, the multi-voltage battery interface of the multi-voltage battery pack 50 is then matched with the input port 20 of the adapter 100.

Figure 12:
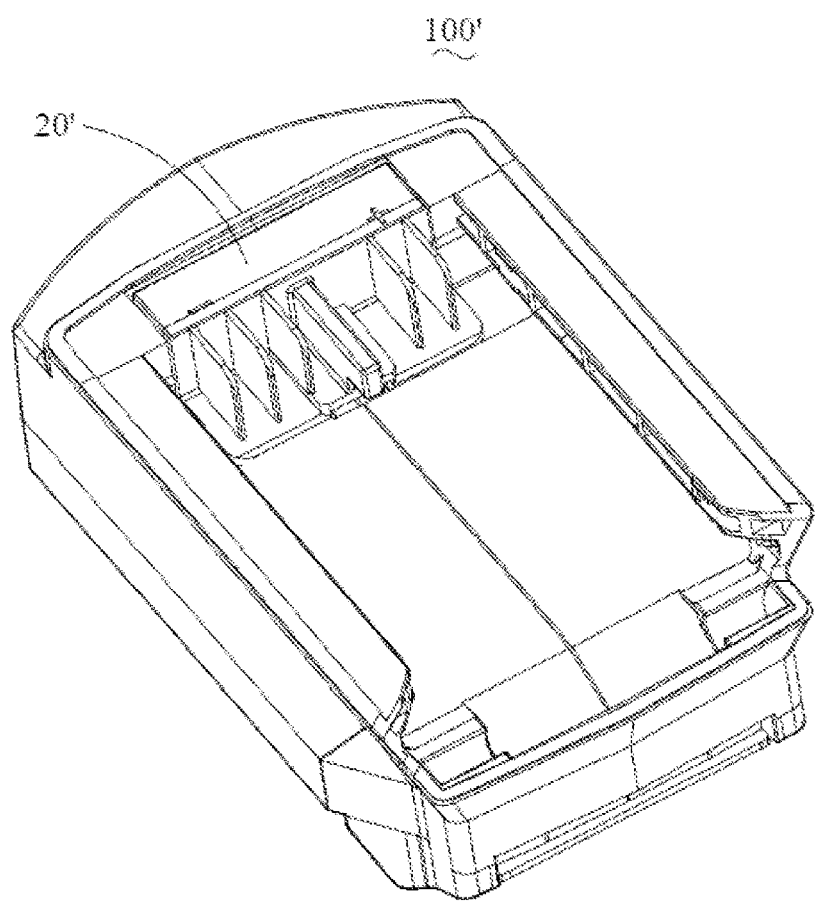
FIG. 12 is another adapter according to another embodiment of the present invention.
Figure 13:
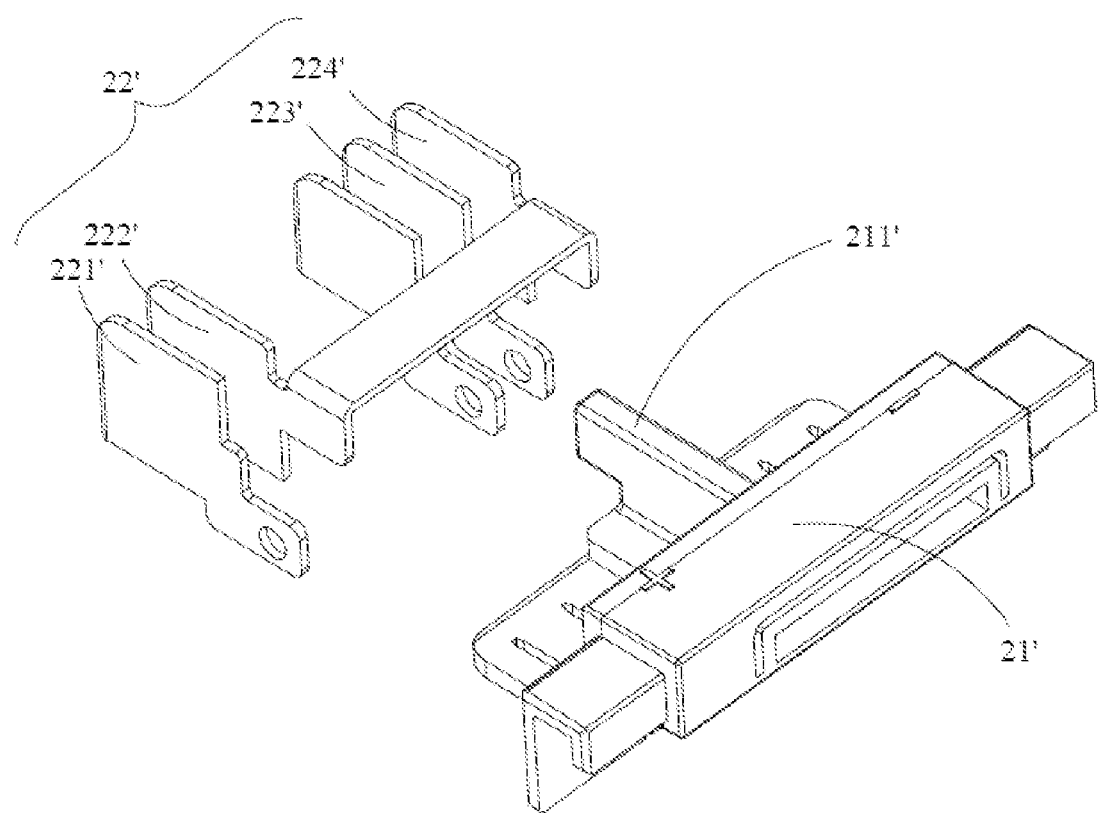
FIG. 13 is an exploded view of an input port of the adapter in FIG. 12.

FIG. 12 shows another adapter 100' according to another embodiment of the present invention. The adapter 100' is substantially identical to the adapter 100 in construction, except for the input port 20'. Referring to FIG. 13, the input port 20' includes a base 21' and an input terminal group 22'. The base body 21' forms with a trigger protrusion 211' protruding outwardly in a mating direction. The trigger protrusion 211' is used to cooperate with a switching device disposed in a corresponding multi-voltage battery pack. When the trigger protrusion 211' is engaged with the switching device and causes the switching device to be triggered, the multi-voltage battery pack outputs a series high voltage. The input terminal group 22' includes a first input terminal 221', a second input terminal 222', a third input terminal 223', and a fourth input terminal 224', which are sequentially disposed. The second input terminal 222', and the third input terminal 223' are located between the first input terminal 221' and the fourth input terminal 224', and the second input terminal 222' is electrically connected with the fourth input terminal 224'.

The invention also discloses an power tool system, which comprises the power tool 60 provided with the power tool interface, the multi-voltage battery pack 50 provided with the multi-voltage battery interface 51 and the adapter 100; the multi-voltage battery interface 51 of the multi-voltage battery pack has at least two coupling states; when the multi-voltage battery interface 51 of the multi-voltage battery pack is in the first coupling state, the multi-voltage battery interface 51 outputs a first voltage; when the multi-voltage battery interface 51 of the multi-voltage battery pack is in the second coupling state, the multi-voltage battery interface 51 outputs a second voltage different from the first voltage; and the multi-voltage battery interface 51 is not couplable with the power tool interface of the power tool 60 which is couplable with the single voltage battery pack.

Compared with the prior art, the adapter 100 of the present invention can connect the multi-voltage battery interface on the battery pack with the voltage input interface on the old power tool, so that the old power tool can use the new battery pack, and the application range of the battery pack with the multi-voltage battery interface is expanded.

Although the present invention has been described in detail with reference to the preferred embodiments, it will be understood by those skilled in the art that various changes may be made, and equivalents may be substituted for elements thereof without departing from the spirit and scope of the present invention.

What is claimed is:

1. An adapter for connecting a multi-voltage battery pack to a power tool, the multi-voltage battery pack provided with a multi-voltage battery interface and configured to output at least two different voltages, the power tool provided with a power tool interface and detachably coupled with a single voltage battery pack, the single voltage battery pack configured to output only one voltage, the multi-voltage battery interface of the multi-voltage battery pack being not couplable to the power tool interface of the power tool, the adapter comprising:
a housing;
an input port disposed in the housing and provided for electrically and mechanically coupling with the multi-voltage battery interface of the multi-voltage battery pack; and
an output port disposed in the housing an provided for electrically and mechanically coupling with the power tool interface of the power tool, the output port electrically connected with the input port;
wherein the power tool can be powered by the multi-voltage battery pack when the multi-voltage battery interface of the multi-voltage battery pack is coupled with the input port of the adapter and the power tool interface of the power tool is coupled with the output port of the adapter, wherein the input port is provided with a switching mechanism matched with the multi-voltage battery interface of the multi-voltage battery pack so as to change the output voltage of the multi-voltage battery pack by changing the connection state of the switching mechanism between a series or parallel supply of voltage from the multi-voltage battery interface.

2. The adapter according to claim 1, wherein the multi-voltage battery pack comprises a first string of battery cells and a second string of battery cells, and the multi-voltage battery interface comprises a first positive terminal connected with a positive electrode of the first string of battery cells, a first negative terminal connected with a negative electrode of the first string battery cells, a second positive terminal connected with a positive electrode of the second string of battery cells and a second negative terminal connected with a negative electrode of the second string of battery cell; the input port comprises a first input terminal, a second input terminal, a third input terminal and a fourth input terminal which are respectively detachably matched with the first positive terminal, the first negative terminal, the second positive terminal and the second negative terminal; the second input terminal and the third input terminal are electrically connected, the multi-voltage battery pack outputs a series voltage when the multi-voltage battery interface of the multi-voltage battery pack engages with the input port of the adapter.

3. The adapter according to claim 1, wherein the housing forms an inserting slot on a side thereof away from the output port, and the multi-voltage battery interface of the multi-voltage battery pack slides into the inserting slot.

4. The adapter according to claim 1, wherein the output port is provided with a full-proof mechanism, and the power tool interface of the power tool is provided with an auxiliary mechanism matchable with the full-proof mechanism.

5. The adapter according to claim 4, wherein the full-proof mechanism is a protrusion, and the auxiliary mechanism is a groove matched with the protrusion.

6. The adapter according to claim 1, further comprises a latching mechanism mounted on the housing; the housing is provided with a receiving cavity; the latching mechanism is provided with a latching arm and a pressing arm, the latching arm is partially received in the receiving cavity and partially protrudes out of the receiving cavity, the pressing arm partially protrudes out of the receiving cavity and is linked with the latching arm; when the pressing arm is pressed, the latching arm enters into the receiving cavity.

7. The adapter according to claim 6, wherein the latching mechanism also comprises an elastic element matched with the pressing arm or the latching arm; the elastic element is elastically deformed when the pressing arm is released; and the pressing arm or the latching arm resets under an action of the elastic element when the pressing arm is pressed.

8. A power tool system, comprising:
a power tool provided with a power tool interface for coupling with a single voltage battery pack, the single voltage battery pack can output only one voltage;
a multi-voltage battery pack provide with a multi-voltage battery interface and configured to output at least two different voltages, the multi-voltage battery interface being not couplable with the power tool interface;
an adapter, the adapter comprising:
a housing;
an input port disposed in the housing and provided for electrically and mechanically coupling with the multi-voltage battery interface of the multi-voltage battery pack; and
an output port disposed in the housing an provided for electrically and mechanically coupling with the power tool interface of the power tool, the output port electrically connected with the input port;
wherein the power tool can be powered by the multi-voltage battery pack when the multi-voltage battery interface of the multi-voltage battery pack is coupled with the input port of the adapter and the power tool interface of the power tool is coupled with the output port of the adapter, wherein the input port is provided with a switching mechanism matched with the multi-voltage battery interface of the multi-voltage battery pack so as to change the output voltage of the multi-voltage battery pack by changing the connection state of the switching mechanism between a series or parallel supply of voltage from the multi-voltage battery interface.

9. The power tool system according to claim 8, wherein the multi-voltage battery pack comprises a first string of battery cells and a second string of battery cells, and the multi-voltage battery interface comprises a first positive terminal connected with a positive electrode of the first string of battery cells, a first negative terminal connected with a negative electrode of the first string battery cells, a second positive terminal connected with a positive electrode of the second string of battery cells and a second negative terminal connected with a negative electrode of the second string of battery cell; the input port comprises a first input terminal, a second input terminal, a third input terminal and a fourth input terminal which are respectively detachably matched with the first positive terminal, the first negative terminal, the second positive terminal and the second negative terminal; the second input terminal and the third input terminal are electrically connected, the multi-voltage battery pack outputs a series voltage when the multi-voltage battery interface of the multi-voltage battery pack engages with the input port of the adapter.

10. The power tool system according to claim 8, wherein the output port of the adapter is provided with a full-proof mechanism, and the power tool interface of the power tool is provided with an auxiliary mechanism matchable with the full-proof mechanism.

11. The power tool system according to claim 8, wherein the adapter has a latching mechanism mounted on the housing; the housing is provided with a receiving cavity; the latching mechanism is provided with a latching arm and a pressing arm, the latching arm is partially received in the receiving cavity and partially protrudes out of the receiving cavity, the pressing arm partially protrudes out of the receiving cavity and is linked with the latching arm; when the pressing arm is pressed, the latching arm enters into the receiving cavity.

12. The power tool system according to claim 11, wherein the latching mechanism also comprises an elastic element matched with the pressing arm or the latching arm; the elastic element is elastically deformed when the pressing arm is pressed; and the pressing arm or the latching arm resets under an action of the elastic element when the pressing arm is released.

13. A power tool system, comprising:
   a multi-voltage battery pack provided with a multi-voltage battery interface and configured to output at least two different voltages;
   a single voltage battery pack configured to output only one voltage;
   a power tool provided with a power tool interface for electrically and mechanically coupling with the single voltage battery pack, the multi-voltage battery interface being not couplable with the power tool interface; and
   an adapter, the adapter comprising:
      a housing;
      an input port disposed in the housing and provided for electrically and mechanically coupling with the multi-voltage battery interface of the multi-voltage battery pack; and
      an output port disposed in the housing an provided for electrically and mechanically coupling with the power tool interface of the power tool, the output port electrically connected with the input port;
   wherein the power tool can be powered by the multi-voltage battery pack when the multi-voltage battery interface of the multi-voltage battery pack is coupled with the input port of the adapter and the power tool interface of the power tool is coupled with the output port of the adapter, wherein the input port is provided with a switching mechanism matched with the multi-voltage battery interface of the multi-voltage battery pack so as to change the output voltage of the multi-voltage battery pack by changing the connection state of the switching mechanism between a series or parallel supply of voltage from the multi-voltage battery interface.

* * * * *